Oct. 28, 1947.    F. E. TERMAN    2,429,652
COUPLING SYSTEM FOR POWER AMPLIFIERS
Filed Feb. 12, 1942    5 Sheets-Sheet 1

INVENTOR
F. E. Terman
BY
ATTORNEY

Oct. 28, 1947.   F. E. TERMAN   2,429,652
COUPLING SYSTEM FOR POWER AMPLIFIERS
Filed Feb. 12, 1942   5 Sheets-Sheet 2
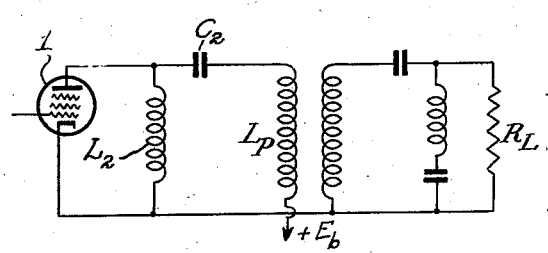
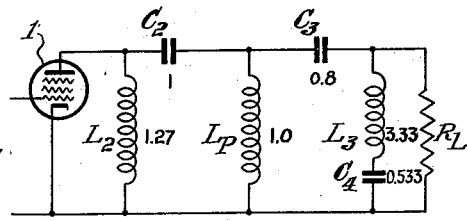
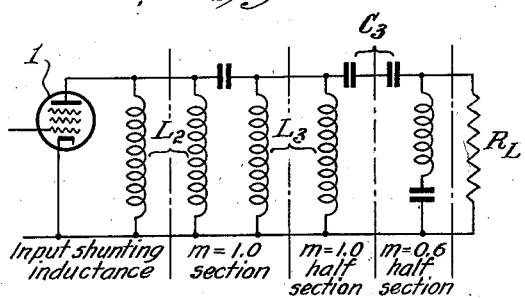
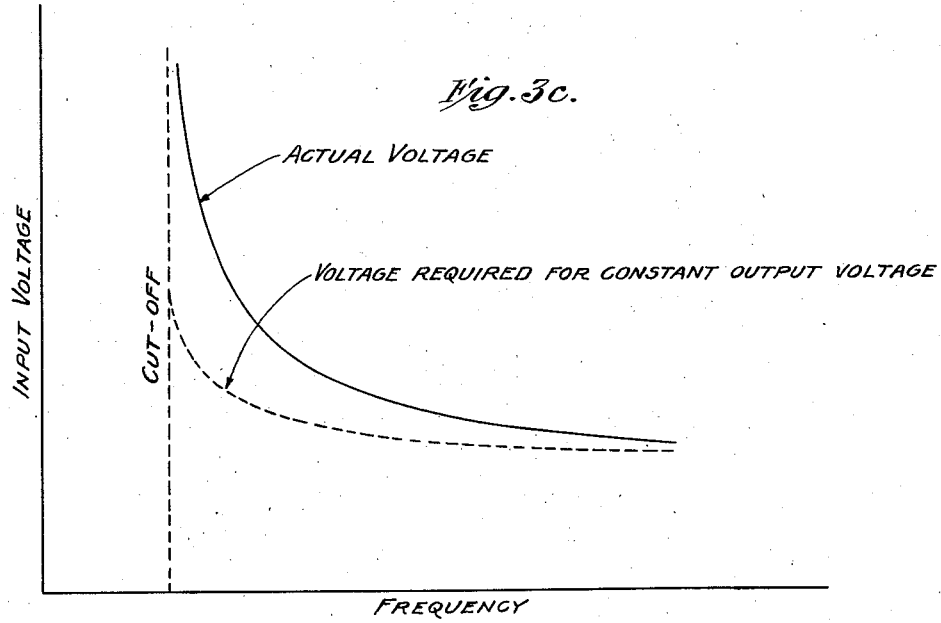

Oct. 28, 1947.     F. E. TERMAN     2,429,652
COUPLING SYSTEM FOR POWER AMPLIFIERS
Filed Feb. 12, 1942     5 Sheets-Sheet 3

INVENTOR
F. E. Terman
BY R. P. Morris
ATTORNEY

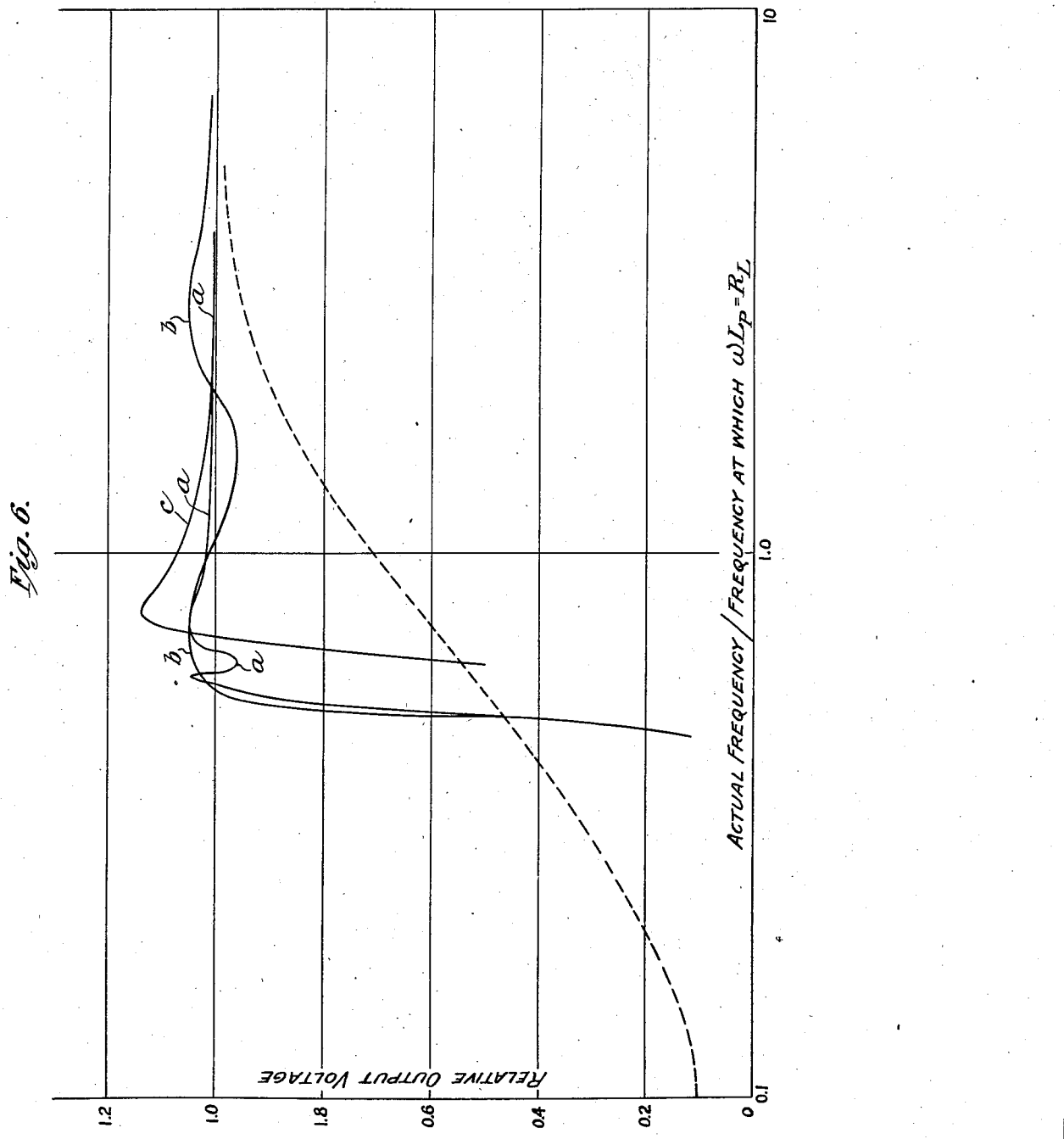

Oct. 28, 1947.  F. E. TERMAN  2,429,652
COUPLING SYSTEM FOR POWER AMPLIFIERS
Filed Feb. 12, 1942  5 Sheets-Sheet 5
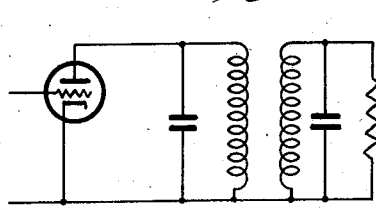
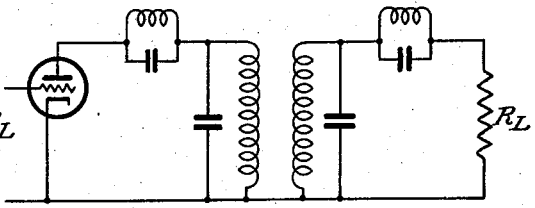
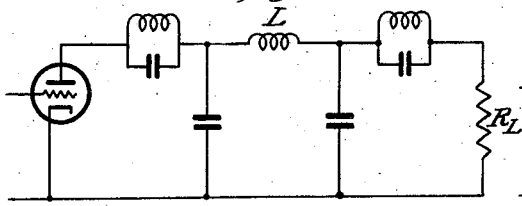
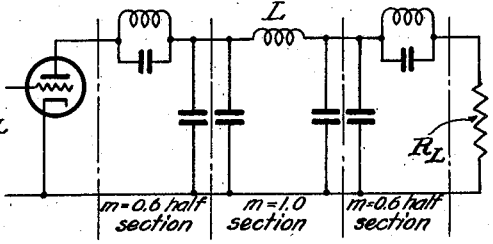
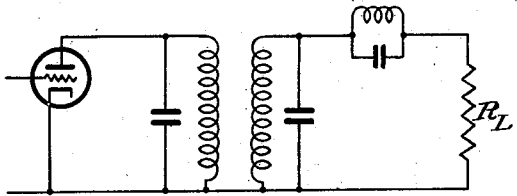
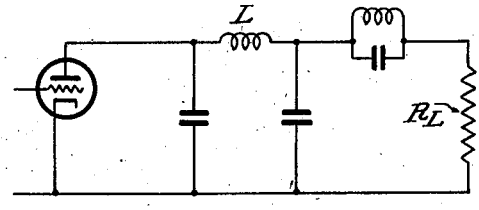
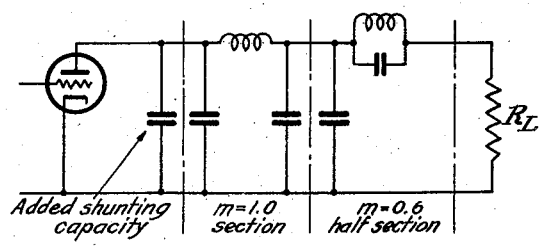
INVENTOR
F. E. Terman
BY
ATTORNEY Patented Oct. 28, 1947

2,429,652

UNITED STATES PATENT OFFICE 2,429,652

COUPLING SYSTEM FOR POWER AMPLIFIERS

Frederick E. Terman, Stanford University, Calif., assignor to International Standard Electric Corporation, New York, N. Y., a corporation of Delaware Application February 12, 1942, Serial No. 430,637

20 Claims. (Cl. 179—171)

1

This invention relates to new and useful improvements in audio-frequency power amplifiers, and more particularly to transformer coupling systems for such amplifiers.

In order to improve the response characteristic of the amplifier, the output and the load are coupled over a filter. The low frequency response is extended by using pentode or similar tubes coupled with the output over a high pass filter, and the high frequency response is extended by coupling over a low pass filter and using triode tubes or the like.

According to the present invention the filter comprises a shunting impedance preferably inserted ahead of a constant-$k$ section.

Figure 2:
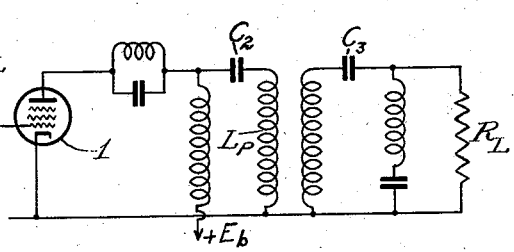
Fig. 2 is a circuit diagram of an amplifier embodying the present invention.
Figure 2A:
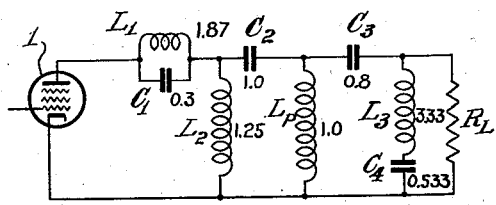
Fig. 2a represents a circuit equivalent to Fig. 2 at low frequencies.
Figure 1B:
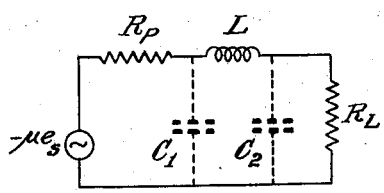
Fig. 1b is an approximate equivalent of the anode circuit of a transformer coupled amplifier employing a triode, accurate for high frequencies.
Figure 2B:
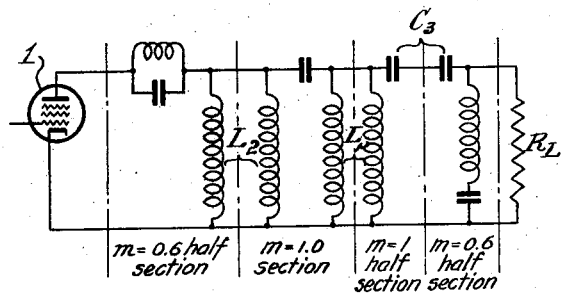
Figure 4:
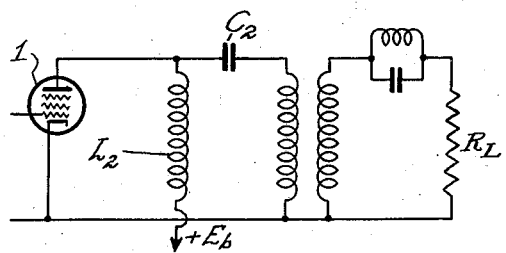
Figure 5:
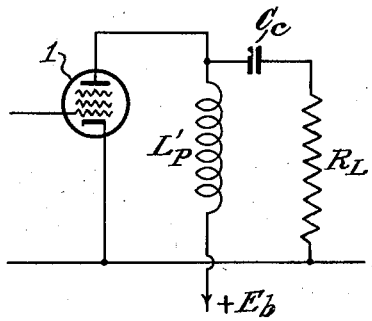

Fig. 2b diagrammatically illustrates Fig. 2 divided into filter sections;

Figs. 3, 4, 8 and 9 diagrammatically illustrate three embodiments of the invention;

Figs. 3a, 3b; 4a, 4b; 8a, 8b; and 9a, 9b bear the same relationship to Figs. 3, 4, 8 and 9, respectively, as Figs. 2a and 8b bear to Fig. 2;

Fig. 3c shows curves illustrative of Fig. 3;

Figs. 5 and 7 diagrammatically illustrate two additional embodiments of the invention; and Fig. 6 is a diagram illustrating the performance of the amplifiers shown in Figs. 1, 2, 3 and 4.

Figure 1:
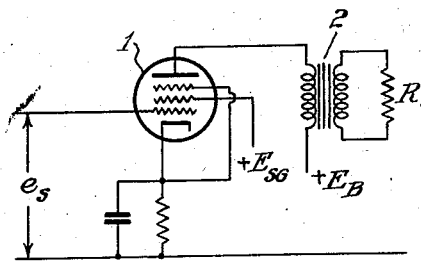
Fig. 1 is a circuit diagram of a prior art transformer coupled amplifier employing a pentode tube.

Fig. 1 represents a portion of a power amplifier using a pentode or beam tube 1 and coupled by means of a transformer 2 to a load $R_L$.

Figure 1A:
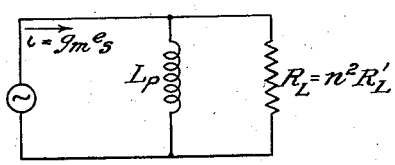
Fig. 1a is an approximate equivalent of the anode circuit of Fig. 1, accurate at low frequencies.

At low frequencies this circuit can be represented by the equivalent circuit of Fig. 1a, in which the transformer 2 and its associated load $R_L$ are represented by the incremental primary inductance $L_P$ of the transformer shunted by an equivalent load resistance $R_L$ formed by referring the actual load $R_L$ to the primary side of the transformer. The tube in the case of pentode and beam tubes can be represented by a constant-current generator.

2

In such an arrangement the output voltage falls off at low frequencies because of the bypassing effect of the primary inductance of the transformer. The amplification characteristic as a function of frequency is given by the dotted curve of Fig. 6, the output voltage falling off to 70 percent of the value at higher frequencies at the frequency which makes the inductive reactance of the transformer primary equal the equivalent load resistance $R_L$. Along with this loss in voltage amplification at low frequencies there is a corresponding loss in power handling capacity resulting from the fact that the load impedance presented to the tube at low frequencies is not the proper value for maximum power output.

In accordance with the present invention the transformer is associated with reactive elements so chosen and arranged as to improve the response characteristics. To do this, the primary inductance $L_P$ is incorporated as a shunt element (Figs. 2, 2a, 2b) in a high-pass filter in which the characteristic impedance is made equal to the load resistance $R_L$. This filter network is preferably designed so that it provides the lowest possible cut-off frequency for a given shunting inductance $L_P$ and load resistance $R_L$.

The full possibilities of this method of extending the response at low frequencies are realized when the inductance $L_P$ is made the mid-shunt inductance of a constant-$k$ (inverse network) high-pass section, with sufficient reactive elements then added to build out the coupling network to the point where it provides a constant image impedance at both ends of the network. The circuit arrangement is shown in Fig. 2, the equivalent circuit at low frequencies in Fig. 2a in which the proper circuit constants are given, the numbers indicating the ratio of reactance to $R_L$ at a frequency for which $\omega L_P = R_L$. Fig. 2b shows the equivalent circuit divided into filters. Here the coupling network, starting from the tube 1 and going toward the load resistance $R_L$ consists, successively, of an M-derived terminating half section with $M=0.6$, a full inverse network (constant-$k$ section), a half constant-$k$ section, and finally a terminating M-derived half section with $M=0.6$. With this arrangement the transformer inductance $L_P$ supplies one of the shunt elements of a filter that is designed to provide uniform transmission and offer a constant impedance throughout the pass band. It can be shown that with a given load resistance and a given shunt inductance, this particular arrangement provides the lowest cut-off frequency that it is possible to obtain, and so gives the best low-frequency response realizable with the given transformer and load resistance.

The response characteristic of such a coupling network is given by curve $a$ in Fig. 6. It will be noted that the output voltage is constant to within ±5% down to a frequency of approximately 55% of the frequency at which simple transformer coupling gives 70.7% response. Furthermore, the new coupling network offers substantially constant impedance at its input terminals down to the cut-off frequency, and has a much better phase characteristic than simple transformer coupling. A coupling network of infinite complexity could be devised that would give absolutely constant response and impedance down to exactly half of the 70.7% frequency of simple transformer coupling, but the finite coupling network of Fig. 2 gives a performance that approaches very closely the best that is theoretically possible.

The coupling network of Fig. 2 can be simplified as shown in Fig. 3 without sacrifice of the voltage amplification characteristic. The relationship between Figs. 3, 3a and 3b is the same as between Figs. 2, 2a and 2b. This network differs from that of Fig. 2 in that the M-derived half section on the input or plate side of the network has been replaced by a shunting inductance. The network that is left, therefore, consists of this auxiliary shunting inductance followed by 1½ sections of the inverse-network type, and an M-derived terminating half section at the load end.

The function served by the auxiliary inductance shunting the input is as follows: Consider for the moment that the auxiliary shunting inductance is omitted. One then has a coupling network that is matched to the load resistance at its output terminals, but has at its input terminals an impedance that is the characteristic impedance of an inverse network filter section with mid-shunt (or $\pi$) termination. Such an impedance characteristic is shown by the solid line in Fig. 3c and causes the voltage across the input terminals to vary, likewise as shown by the solid line.

The response characteristic of the coupling network in the absence of the auxiliary shunting inductance is then not constant with frequency over the pass band, for although the coupling network provides a voltage transformation because of the unsymmetrical impedance characteristic it possesses, the voltage transformation is proportional to the square root of the impedance ratio, whereas the voltage developed across the input terminals is directly proportional to the input impedance.

Accordingly, to obtain a constant voltage across the load resistance $R_L$, one desires a voltage across the input terminals, and hence an input impedance, that varies according to the dotted line in Fig. 3c. This desired input impedance can be approximated relatively closely by shunting the input terminals of the coupling network with a suitable auxiliary shunt inductance as in Fig. 3. The exact value of the shunt inductance that should be used will depend on the features in the low-frequency response that are most desired. Desirable proportions, however, are such that the total shunt inductance (auxiliary inductance in parallel with shunt input inductance of the filter), is of the order of 1.27 $L_P$ (Fig. 3a).

The amplification characteristic obtained with the coupling network of Fig. 3 is given by curve $b$ of Fig. 6. It will be noted that this characteristic is even superior to that of the preceding network, although it is inferior from the point of view of the impedance offered to the tube at low frequency.

It will be noted that the coupling network of Fig. 3 is essentially an ordinary shunt-feed arrangement, having properly proportionated shunt-feed choke and coupling condenser, with the addition of the reactive network $C_3L_3C_4$ on the secondary side of the transformer.

Figure 4A:
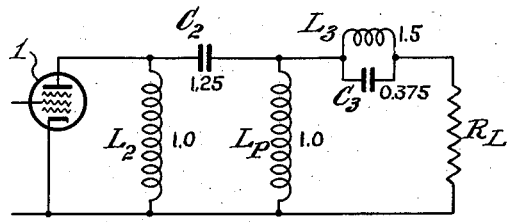
Figure 4B:
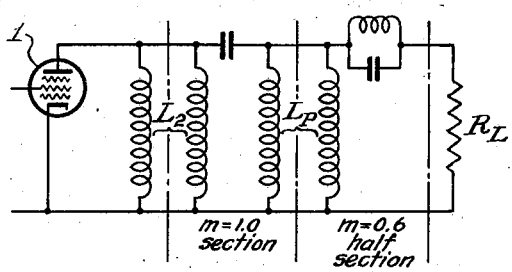

A still further simplification of the coupling network is possible, as shown in Figs. 4, 4a and 4b. This arrangement is analogous to Fig. 3 except that the terminating half section on the load end follows directly after the first inverse network section, without the intervening inverse-network half section. The shunting inductance that is supplied by the transformer primary no longer represents the shunt inductance of an inverse-network section, however. As a result, if one starts with a given load resistance and a given primary inductance, it is necessary to design the filter coupling network with a cut-off frequency 25% higher than in the two preceding cases.

The voltage amplification characteristic obtained with the network of Fig. 4 with the indicated proportions, is given by curve $c$ Fig. 6. It will be noted that the voltage amplification is constant to within ±14% down to a frequency that is approximately 68% of the frequency at which simple transformer coupling gives 70.7% response. This is not quite as good a characteristic as obtained with the previous networks, but is a decided improvement over simple transformer coupling. Furthermore, this improvement is achieved by the addition of a single resonant circuit $L_3C_3$ to a properly designed shunt-feed system.

It will be seen, therefore, that very marked improvements in the low-frequency response characteristic can be obtained in the case of a pentode or beam type of power amplifier by the use of suitable coupling networks. It is possible to realize with a reasonably simple network practically all of the possibilities that are theoretically obtainable within the limitations of a specified load resistance and transformer primary inductance. In the simpler forms, the coupling networks involved are merely properly designed shunt-feed arrangements to which two or three reactive elements have been added on the secondary side of the transformer. It is to be noted that the shunt feed choke and coupling condenser must be given specific sizes, but that the values called for represent less expensive elements than is the case when the design of the shunt-feed system is carried out on the brute force basis.

The arrangements described in Figs. 2–4 for improving the low-frequency response also apply directly to coupling systems in which the transformer is replaced by the simple shunt feed arrangement shown in Fig. 5. With such a direct-coupled system, inductance $L_P'$ of the shunt feed choke corresponds to one of the shunting inductances of the filter, and the blocking condenser $C_C$ is built into the coupling network as a series condenser of the filter. Thus in the coupling network of Fig. 2, $L_P'$ and $C_C$ could be used to supply either $L_2$ and $C_2$, while in Fig. 4 they would supply $L_2$ and $C_2$, respectively.

The principle outlined above can be used to improve the high-frequency characteristics of an output transformer, particularly in the case of triode power tubes. At high frequencies the outer transformer acts as a series inductor L between shunting capacities $C_1$ and $C_2$ supplied by the primary and secondary distributed capacities (see Fig. 1c). Under practical conditions the shunting capacities have little effect, with the result that the voltage response at high-frequencies falls off because the inductive reactance of the transformer reduces the current in the load.

Some improvement in the high-frequency characteristic is to be gained by padding out the primary and secondary capacities as shown in Fig. 7 to provide a full inverse-network section having the highest frequency cut-off that is possible and still maintain a reasonably constant output voltage when the inductance L, the load resistance $R_L$, and the plate resistance $R_P$ are given.

The greatest improvement is to be obtained, however, by building out the coupling network so that the leakage inductance L (Fig. 1c) of the transformer serves as the full series inductance of an inverse-network low-pass section to which terminating half sections are added, as indicated in Figs. 8, 8$^a$ and 8$^b$. This arrangement provides a marked extension of the high-frequency characteristic, and also maintains a constant impedance characteristic up to the cut-off frequency. In the case where the tube is operated with a load resistance considerably greater than the plate resistance, the cut-off frequency of the coupling network can be almost twice the frequency at which a simple transformer coupling would give 70.7% of the mid-frequency response. In order to obtain this desirable result, it is merely necessary to add two resonant circuits and two shunting condensers to the transformer.

A modification of the coupling network in Fig. 8 is given in Figs. 9, 9$a$, 9$b$. Here the terminating half section on the tube side of the network has been replaced by a shunting condenser in the same manner, and following the same line of reasoning, by which the input terminating half section of Fig. 2 was replaced by a shunt inductance in Fig. 3. This arrangement eliminates one of the resonant circuits required in the coupling network and gives approximately the same voltage response characteristic as does Fig. 7, although the impedance characteristic at high-frequencies is not as good.

The coupling networks that have been described are capable of extending by approximately one octave the low-frequency response characteristic of a transformer-coupled power amplifier using pentode or similar tubes. With triodes, a similar extension approaching one octave can be realized in the high-frequency response. The networks are not, however, particularly useful at low-frequencies in the case of triode tubes, or high-frequencies in the case of pentode tubes, since here the only improvement is in improved impedance characteristics.

The networks proposed are simple enough to represent a highly practical means of obtaining improved characteristics. They should be particularly useful when such wide bands are to be handled as to rule out the ordinary output transformer.

What I claim is:

1. An audio frequency power amplifier having an output circuit, a load, a transformer coupling between the output and the load including a filter preferring at least one of the ends of the audio frequency range and having a characteristic impedance substantially equal to the load resistance.

2. An audio frequency power amplifier including a pentode tube and having an output circuit, a load, a transformer coupling between the output and the load including a high pass filter having a characteristic impedance substantially equal to the load resistance and providing minimum cut-off frequency for a given shunting inductance and load resistance; the shunting inductance of said filter having a value to match approximately the incremental primary inductance of said transformer coupling.

3. An audio frequency power amplifier having an output circuit, a load, a transformer coupling between the output and the load with shunt feed comprising a filter network having a series impedance and a shunt impedance including the shunt feed and the transformer primary inductance, said network having a characteristic impedance substantially equal to the load resistance.

4. An audio frequency amplifier including a pentode tube and having an output, a load, a transformer coupling between the output and the load including a shunt inductance through which said output circuit is fed and a capacitance in series in the output circuit between said load and inductance.

5. An audio frequency power amplifier having an output circuit, a load, a transformer coupling between the output and the load with shunt feed comprising a filter network having a shunt impedance including the shunt feed, and a plurality of reactive elements on the secondary side of said shunt-feed, said network having a characteristic impedance substantially equal to the load resistance.

6. An audio frequency power amplifier including a pentode tube and having an output circuit, a load, a transformer coupling between the output and the load comprising a shunt-feed to match approximately the incremental primary inductance of said transformer coupling, and a plurality of reactive elements on the secondary side of said shunt-feed.

7. An audio frequency amplifier having an output circuit, a load, a transformer coupling between the output and the load including a filter comprising a shunt element, a constant-$k$ section, and an M-derived terminating half section.

8. An audio frequency power amplifier including a triode tube and having an output circuit, a load, a transformer coupling between the output and the load including a low pass filter comprising a shunting capacity, a constant-$k$ section, and an M-derived terminating half section.

9. An audio frequency power amplifier including a pentode tube and having an output circuit, a load, a transformer coupling between the output and the load including a high pass filter comprising a shunting inductance, a constant-$k$ section, and an M-derived terminating half section.

10. An audio frequency power amplifier comprising a triode tube and having an output circuit, a load, a coupling between the output and the load including a transformer, two resonant circuits, and two shunting condensers.

11. An audio frequency power amplifier comprising a triode tube and having an output circuit, a load, a transformer coupling network between the output and the load comprising a constant-$k$ low pass section between terminating half sections, the constant-$k$ section having a full series inductance to approximately match the leakage inductance of said transformer coupling between the output and the load.

12. An audio frequency amplifier having an output circuit, a load, a transformer coupling between the output and the load, a filter between the output and the load having a shunt inductance, and an auxiliary parallel shunt inductance, the total shunt inductance being of the order of 1.27 $L_P$, where $L_P$ is the incremental primary inductance of said transformer coupling.

13. An audio frequency power amplifier having an output circuit, a load, and a transformer coupling between the output and the load comprising a filter having a constant-$k$ section whose mid-shunt inductance includes the transformer primary inductance, and further reactive means to build out the section to cause the filter to have constant image impedance at its ends.

14. An audio frequency power amplifier including a triode tube and having an output circuit, a load, a transformer coupling between the output and the load, a low pass filter between the output and the load and comprising a constant-$k$ section.

15. An audio frequency power amplifier including a pentode tube and having an output circuit, a load, a transformer coupling between the output and the load, and a high pass filter between the output and the load comprising a constant-$k$ section.

16. An audio frequency power amplifier including a triode tube and having an output circuit, a load, a transformer coupling between the output and the load, a low pass filter between the output and the load comprising a shunting capacity, a constant-$k$ section, and an M-derived terminating half section.

17. An audio frequency amplifier including a pentode tube and having an output circuit, a load, a transformer coupling between the output and the load, a high pass filter between the output and the load comprising a shunting inductance, a constant-$k$ section, and an M-derived terminating half section.

18. An audio frequency amplifier including a pentode tube and having an output circuit, a load, a transformer coupling between the output and the load, a high pass filter between the output and the load comprising a shunting inductance, a constant-$k$ section, a half constant-$k$ section, and an M-derived terminating half section.

19. An audio frequency power amplifier having an output circuit, a load, a transformer coupling between the output and the load including a high pass filter composed of a constant-$k$ high pass section the mid shunt inductance of which has a value to match approximately the incremental primary inductance of said transformer output coupling, and reactive elements in said filter to provide constant image impedance at both ends thereof.

20. In an audio frequency power amplifier including a pentode tube, a load, a transformer coupling between the tube and the load including, in the order named, an M-derived terminating half section, a constant-$k$ section, a half constant-$k$ section, and a terminating M-derived half section, the mid shunt inductance of the constant-$k$ section having a value to match approximately the incremental primary inductance of said transformer coupling between the tube and the load.

FREDERICK E. TERMAN.

REFERENCES CITED

The following references are of record in the file of this patent:

UNITED STATES PATENTS

| Number | Name | Date |
|---|---|---|
| 1,604,981 | Elsasser | Nov. 2, 1926 |
| 1,611,932 | Mathes | Dec. 28, 1926 |
| 2,226,739 | Percival | Dec. 31, 1940 |
| 2,273,519 | Haantjes | Feb. 17, 1942 |
| 2,167,079 | Landon | July 25, 1939 |
| 2,167,137 | Wheeler | July 25, 1939 |
| 1,772,374 | Weinberger | Aug. 5, 1930 |
| 1,636,713 | Reier | July 26, 1927 |